United States Patent [19]
Takeda et al.

[11] Patent Number: 5,349,368
[45] Date of Patent: Sep. 20, 1994

[54] MACHINE TRANSLATION METHOD AND APPARATUS

[75] Inventors: Kimihito Takeda, Odawara; Hideki Hirakawa, Kawasaki; Hisahiro Adachi, Chigasaki; Shinya Amano, Yokohama, all of Japan

[73] Assignee: Kabushiki Kaisha Toshiba, Kawasaki, Japan

[21] Appl. No.: 799,884

[22] Filed: Dec. 2, 1991

Related U.S. Application Data

[63] Continuation of Ser. No. 477,129, Feb. 7, 1990, abandoned, which is a continuation of Ser. No. 109,524, Oct. 19, 1987, abandoned.

[30] Foreign Application Priority Data

Oct. 24, 1986 [JP] Japan .................................. 61-251820

[51] Int. Cl.$^5$ ............................................. G09G 5/34
[52] U.S. Cl. ..................... 345/115; 345/124; 345/193; 364/419.03; 434/157
[58] Field of Search ............... 340/721, 723, 726, 710, 340/745; 364/419, 419.03, 419.04; 434/157; 395/144, 145, 153; 345/115, 124, 193

[56] References Cited

U.S. PATENT DOCUMENTS

| | | | |
|---|---|---|---|
| 4,158,236 | 6/1979 | Levy | 364/900 |
| 4,159,536 | 6/1979 | Kehoe et al. | 364/900 |
| 4,193,119 | 3/1980 | Arase et al. | 340/710 |
| 4,386,410 | 5/1983 | Pandya et al. | 364/521 |
| 4,429,306 | 1/1984 | Macauley et al. | 340/745 |
| 4,437,093 | 3/1984 | Bradley | 340/726 |
| 4,599,612 | 7/1986 | Kaji et al. | 340/723 |
| 4,654,798 | 3/1987 | Taki et al. | 364/419 |
| 4,663,617 | 5/1987 | Stockwell | 340/726 |
| 4,734,689 | 3/1988 | Kurakake | 340/721 |

*Primary Examiner*—Richard Hjerpe
*Attorney, Agent, or Firm*—Oblon, Spivak, McClelland, Maier & Neustadt

[57] ABSTRACT

This invention relates to a display method, and in particularly, to an output display method for a machine translation system, Display section has a predetermined portion for translated sections, and identifies original sentences or characters when a referring request is made to a part of the translated sentences. Highlight display of original sentences may be scrolled synchronously with the scrolling of the translated sentences or independently.

19 Claims, 13 Drawing Sheets

| TRANSLATED SENTENCE | TRANSLATION DISPLAY COORDINATES | | SENTENCE NUMBER | WORD NUMBER |
|---|---|---|---|---|
| | X | Y | | |
| ⋮ | ⋮ | ⋮ | ⋮ | ⋮ |
| 私 | 3 | 4 | 3 | 1 |
| は | 3 | 5 | 3 | 1 |
| 学 | 3 | 6 | 3 | 2 |
| 校 | 3 | 7 | 3 | 2 |
| へ | 3 | 8 | 3 | 2 |
| ⋮ | ⋮ | ⋮ | ⋮ | ⋮ |

BUT A CHILD WHO HAS SUFFERED AN INJURY TO THE LEFT HEMISPHERE CAN STILL LEARN A LANGUAGE, BECAUSE THE RIGHT HEMISPHERE TAKES OVER THE FUNCTIONS OF THE LEFT HEMISPHERE. THE LINGUIST, HOWEVER, DOUBTED THAT THOSE CHILDREN ARE ABLE TO MASTER THE IMPORTANT POINT OF SYNTAX. THE CHILDREN CAN MASTER THE SEMANTICS, BUT THEY HAVE TROUBLE WITH PASSIVE VOICE AND OTHER COMPLEX TRANSFORMATIONS.

MATURATION OF THE HUMAN BRAIN AFFECTS OTHER FUNCTIONS IN THE SAME WAY THAT IT AFFECTS LANGUAGES. INTELLECTUAL ACTIVITIES SUCH AS MUSIC AND CHESS MUST BE LEARND IN AN EARLY AGE FOR COMPLETE MASTERY. ONE MAN WHO

言語を学ぶことは成人にとってさえ難しい。数年で、子供達は、外国の言語を学び始めた成人が達成しない母国語の習得を得る。思春期に、頭脳は、母国語を処理するために非常に効率的な1レベルまで成熟する。文がバックグランドノイズの存在において話されるとき、成人は、それらを子供達より容易に理解できる。効率における利得は、柔軟性の損失を伴う。言語を学ばないで、思春期に達した野生の子供達は、後の寿命で言語を話すことを学べない。成人は、外国のアクセントなしの新しい言語を話すと知ることを難しく感じるだろう。

言語を学ぶという子供の天性を説明するために、言語学者は、言語にだけささげられた精神器官の存在を仮定した。まだ、それが肝臓か腎臓のような物理装置を提供するので、リードORGANは論争の的になっている。成人の頭脳は、左の半球の言語にいくつかのエリアをささげる。しかし、右側の半球が左の半球の機能を引き継ぐので、左の半球への害を受けた子供は言語をまだ学べる。しかしながら、言語学者は、それらの子供達が統語論の重要なポイントをマスター出来るかどうか疑った。子供達は、意味をマスター出来る。しかし、それらは受動態のため複雑な変換に関して問題を持っている。

| TRANSLATED SENTENCE | TRANSLATION DISPLAY COORDINATES | | SENTENCE NUMBER | WORD NUMBER |
|---|---|---|---|---|
| | X | Y | | |
| ⋮ | ⋮ | ⋮ | ⋮ | ⋮ |
| 私 | 3 | 4 | 3 | 1 |
| は | 3 | 5 | 3 | 1 |
| 学 | 3 | 6 | 3 | 2 |
| 校 | 3 | 7 | 3 | 2 |
| へ | 3 | 8 | 3 | 2 |
| ⋮ | ⋮ | ⋮ | ⋮ | ⋮ |

I FOUND THE HOSPITAL.

DICTIONARY REFERRING

<ENGLISH>
☐ FIND (VERB)
■ FOUND (VERB)

< TRANSLATED WORDS >
☐ 基づく
☐ 作る
☐ 建てる
■ 設立する
☐ 創立する

FIG. 12C

I FOUND THE HOSPITAL.

私は病院を設立する。

MACHINE TRANSLATION METHOD AND APPARATUS

This application is a continuation of application Ser. No. 07/477,129, filed on Feb. 7, 1990, now abandoned, which is a continuation of U.S. Pat. No. 07/109,524 filed Oct. 19, 1987 abandoned.

BACKGROUND OF THE INVENTION

The present invention relates to a machine translation system for processing an original sentence of a first language to obtain a translated sentence of a second language and, more particularly, to a machine translation system which can improve translation efficiency.

In recent years, various machine translation systems for translation using a computer system have been developed, e.g., a processing system for translating English sentences into Japanese sentences or vice versa, and the like.

A basic processing operation in these systems will be briefly described. Morphemes constituting an input original sentence or its sentence structure are analyzed to divide the original sentence into predetermined processing units, e.g., words (or phrases). A translation dictionary is referred to for each processing unit to obtain a translated word (or phrase) corresponding to the processing unit. The translated words (or translated phrases) are combined in accordance with a given translation rule, thus obtaining a translated sentence.

However, since a reliable technique for interpreting the meaning of a natural language has not yet been established, it is difficult to immediately obtain an appropriate translated sentence through the machine translation. More specifically, the English word "find", for example, has meanings including "to learn", "to perceive", "to come upon", "to attain", "to solve", "to detect", "to uncover", and "to discover". When this word must be translated into Japanese, it has different translated words corresponding to the above meanings. In this manner, a single original word often has a plurality of translation possibilities. In this case, selection of the translated word from multiple possibilities largely influences the quality of translation from an original sentence into a translated sentence.

In a conventional system, a plurality of translation possibilities corresponding to a processing unit (original word) are presented to an operator, and the operator determines and selects appropriate translated words to constitute a translated sentence.

However, even if a translated sentence is obtained in this manner, an inappropriate translated word often still remains in the translated sentence. For this reason, the operator must correct the inappropriate translated word in the translated sentence through post-edit processing.

When such edit processing is performed, if a display device has a fixed display format for the translation result, incorrect choices or selections may be made. For example, when a translated sentence including translated words to be corrected and the original corresponding sentence are displayed simultaneously and translation/edit processing is performed while comparing the two sentences, it is easy to understand the correspondence between the two sentences. However, it is hard to grasp consistency or context in the document. As a result, even though appropriate translated words may be obtained for each translated sentence, the translated sentence may be inappropriate when viewed in the context of in the entire document.

In contrast to this, original sentences and their corresponding translated sentences can be displayed continuously. In this case, the above-mentioned drawbacks can be avoided, and the context or consistency in the entire document can be satisfactorily maintained.

However, with this method, it often is difficult to quickly and reliably grasp the correspondence between the original and translated sentences and that between original and translated words therein.

Thus, the display formats of the translation result impairs the efficiency of the translation/edit processing, thereby interfering with effective post processing.

SUMMARY OF THE INVENTION

It is an object of the present invention to provide a machine translation system with which context or consistency in a document can be appropriately grasped, and the correspondence between an original sentence and a translated sentence can be easily understood to allow efficient translation/edit processing.

In particular, a corresponding original sentence is displayed on a predetermined area of the screen when the corresponding part of the translated sentence is highlighted.

BRIEF DESCRIPTION OF THE DRAWINGS

The accompanying drawings, which are incorporated in and constitute a part of the specification, illustrate several embodiments of the invention, and together with the description, serve to explain the principles of the invention.

Of the drawings:

FIGS. 9(I)–9(III) and 11 show flow charts to describe an other embodiment of the present invention.

DETAILED DESCRIPTION OF THE PREFERRED EMBODIMENTS

Figure 1:
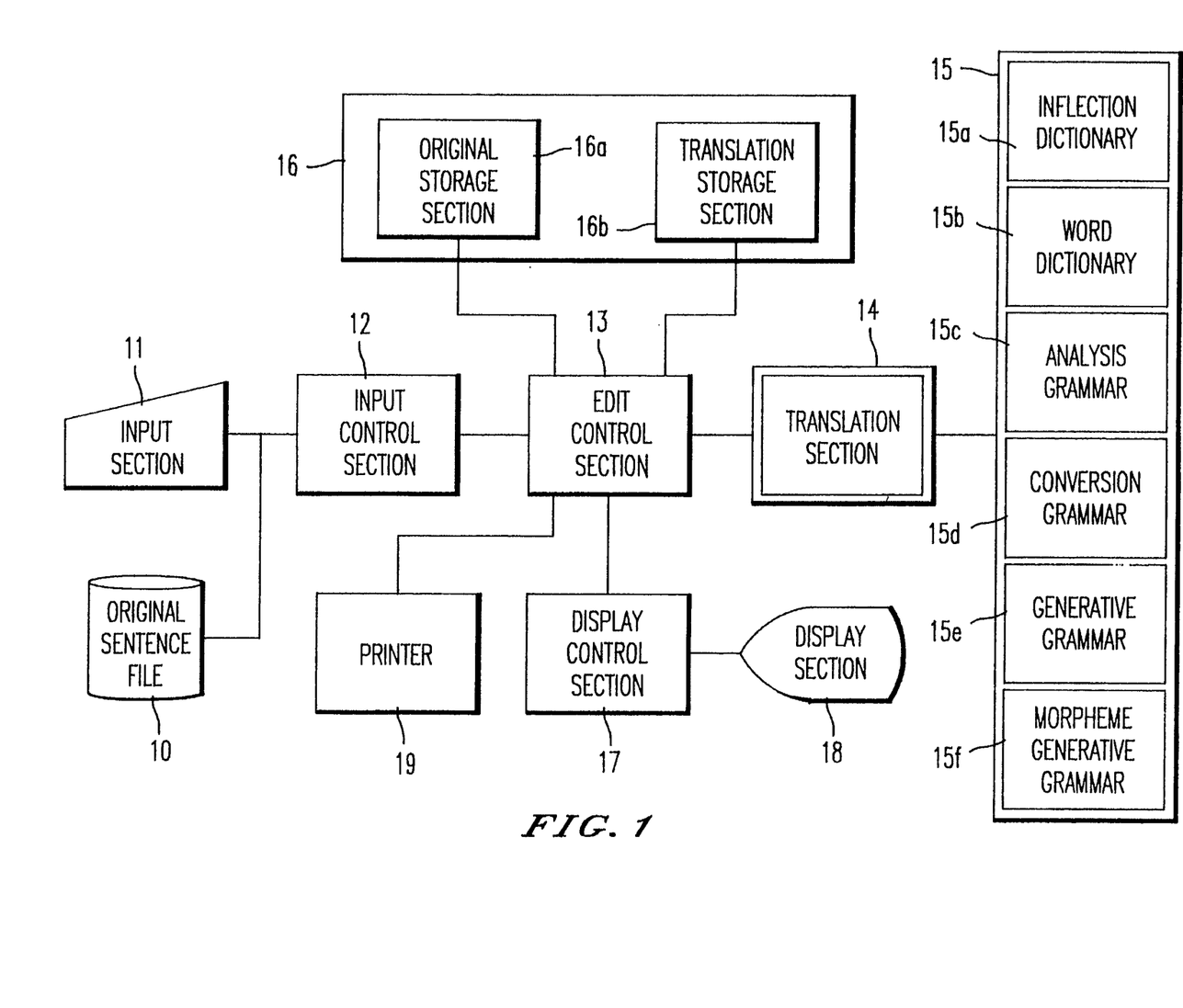
FIG. 1 shows a block diagram of an embodiment of the present invention.

FIG. 1 shows a machine translation system according to an embodiment of the present invention. In this embodiment, English sentences are input and translated into Japanese sentences.

An English sentence input at an input section 11 comprising a keyboard is stored in an original storage section 16a as an original sentence to be translated.

An input control section 12 recognizes the type, form and contents of the original sentence to be input from an original sentence file 10, and extracts a processing unit to be translated.

A translation section 14 operates under the control of an edit control section 13. The translation section 14 refers to linguistical information necessary for translation processing which has been prestored in a dictionary section 15 to sequentially translate predetermined processing units of the original sentence in the original storage section 16a. The translated Japanese sentences which are obtained through machine translation by referring to the linguistical information, are sequentially stored in a translation storage section 16b, corresponding to the original sentence.

Further, the linguistical information stored in the dictionary section 15 includes, e.g., an inflection (regular and irregular inflection ) dictionary 15a, a word dictionary 15b, an analysis grammar 15c, a conversion grammar 15d, a generative grammar 15e and a morpheme generative grammar 15f.

The edit control section 13 drives a display control section 17. The display control section 17 displays the translated sentence stored in the translation storage section 16b on a display section 18, for example, a CRT display, after the translation of all or a part of the input sentence. The post-edit processing is executed on the translated sentence displayed on the display section 18, and is executed by, e.g., referring to the linguistical information stored in the dictionary section 15 in accordance with the control information input from the input section 11.

The translated sentences (Japanese sentences) corresponding to the original sentences (English sentences) which have completed the post-edit processing are hard-copied by a printer 19.

Figure 2:
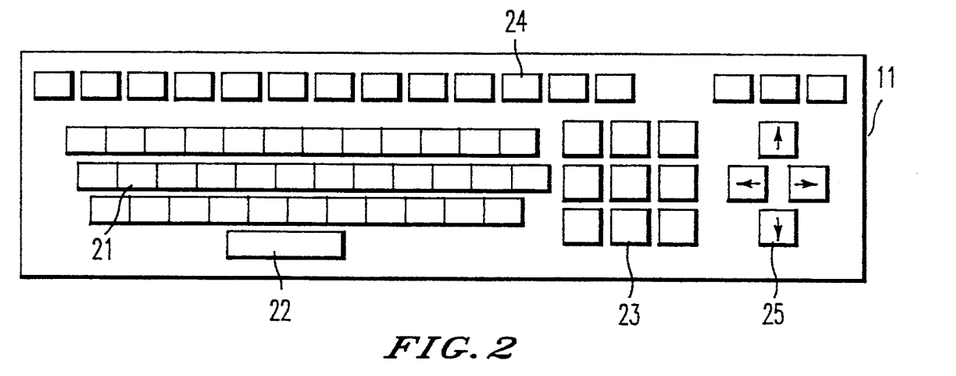
FIG. 2 shows a keyboard layout for the input section of FIG. 1.

FIG. 2 shows a keyboard layout for the input section 11. The keyboard includes a character data input key group 21, a translation instruction key 22, an edit key group 23, a function key group 24, a cursor control key group 25 on the display section 18, and the like.

The input section 11 also can call the original sentence from the original sentence file 10, instead of using direct input from the keyboard.

Figure 3:
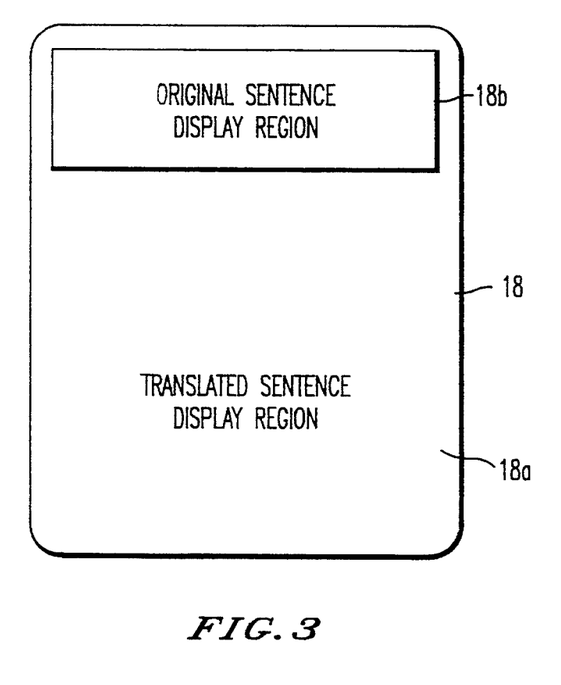
FIG. 3 shows a display format of an embodiment of the present invention.

FIG. 3 shows a display screen format of the display section 18 of the embodiment of the present invention for displaying a translated sentence and the original language sentence corresponding to the translated sentence. Ordinarily, the entire display screen is only a translated sentence display region 18a. However, in this invention an original sentence display region 18b is established on the upper part of the display section 18 compling with the referring request. The main part of the original sentence to be inspected is displayed together with the succeeding and preceding portions of the original sentence on the original sentence display region 18b. The area of the original sentence display region 18b is predetermined.

Therefore, the part of the original sentence which corresponds to the translated sentence to be inspected is necessarily displayed on the original sentence region 18b, and the succeeding and preceding portions of the original sentence are displayed on the remaining area of the original sentence display region 18b.

Figure 4:
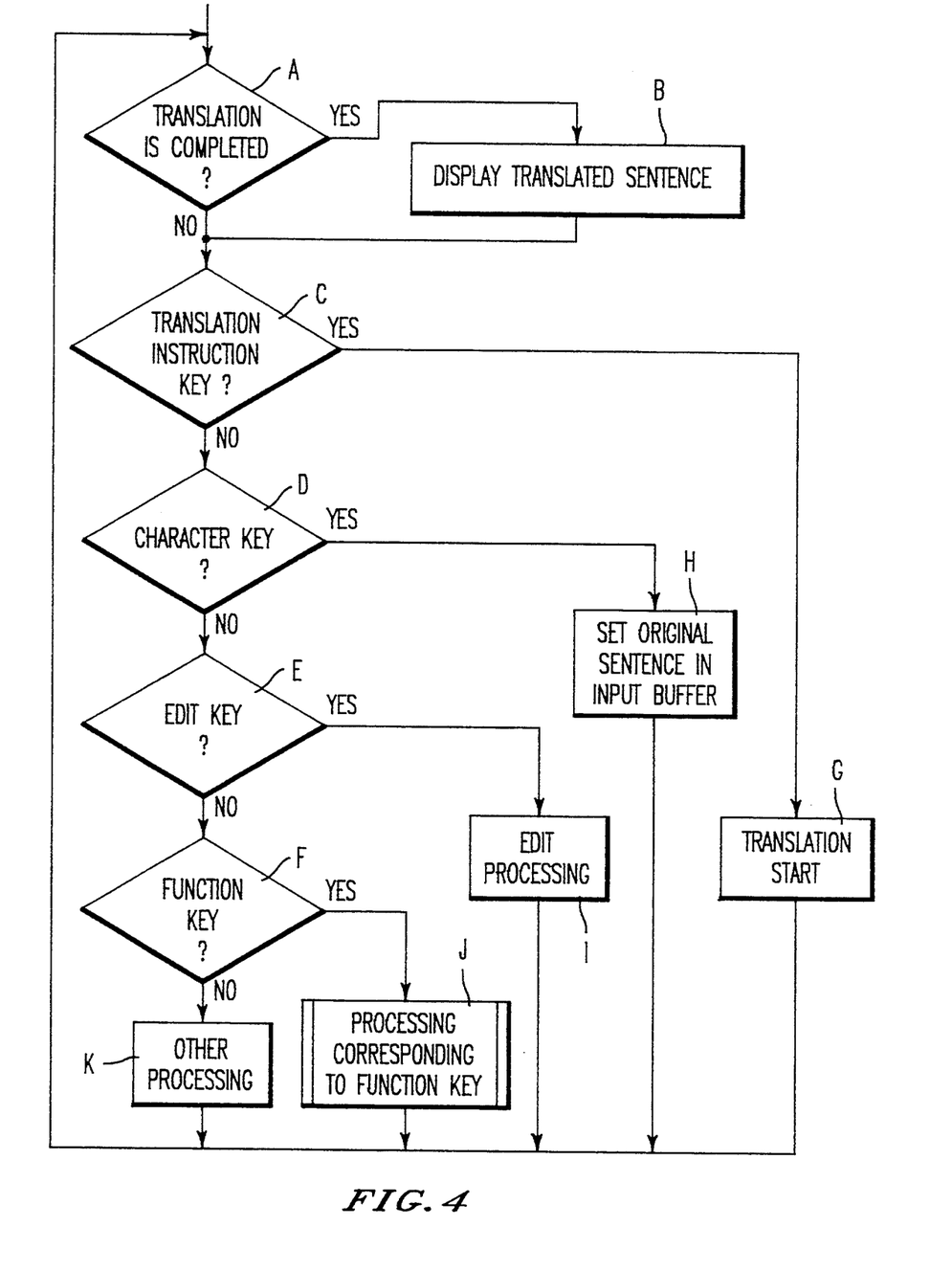
FIGS. 4 to 6 and 8 are flow charts to describe the operation of the present invention.

FIG. 4 shows a basic operating sequence of the system shown in FIG. 1. The edit control section 13 allows editing of the translation completion information supplied from the translation section 14 through various key information input from the input section 11 in accordance with the operating sequence shown in FIG. 4. Thus the operator controls the translation/edit processing in a convenient manner.

The edit control section 13 watches the translation processing status in the translation section 14 (step A). When the edit control section 13 detects the completion of the translation processing for a single original sentence, it causes the translation storage section 16b to store the translated sentence and causes the display section 18 to display it (step B). The operator may suppress the display of translated information until the edit request.

The edit control section 13 discriminates the key information input from the input section 11 (steps C, D, E, and F). If the input key information represents a "translation instruction key" (step C), the edit control section 13 transfers the input original sentence stored in the original storage section 16a to the translation section 14 to initiate the translation processing (step G).

If the input key information represents a "character key" (step D), its character code is stored in an input buffer (step H) and is also stored in the original storage section 16a.

If the input key information represents an "edit key" (step E), edit processing associated with the edit key is executed for the translated sentence (step I). Similarly, if the input key information a "function key" (step F), processing corresponding thereto is executed (step J).

If there is no key information or if the input key information is other than the above mentioned keys, other processing, e.g., hard-copy output of the translated sentence stored in section 16 (by means of printer 19), is executed (step K).

With this operating sequence of the edit control section 13, when an operator acts the character input key group of the keyboard to input characters, the character information is sequentially set into the input buffer (not shown) provided in the input control section 12, and is also stored in original storage section 16a as an original sentence to be translated (steps D and H).

If the translation instruction key 22 is operated at an arbitrary time during a character input operation. e.g., when the input of one sentence has being completed, the translation processing for the input original stored in the input buffer is started in accordance with the key input (steps C and G). Upon completion of the translation processing, the translated sentence which is obtained there through is displayed on the translated sentence display region 18a of the display section 18 (steps A and B).

If the sentence must be edited, e.g., corrected, the cursor control key group 25 is operated to adjust the cursor position to a correcting position, and edit processing is then executed by operating the edit key group 23, e.g., correct key, insert key, delete key, and the like (steps E and I). In this manner, the basic operation of the machine translation process is controlled.

Figure 5:
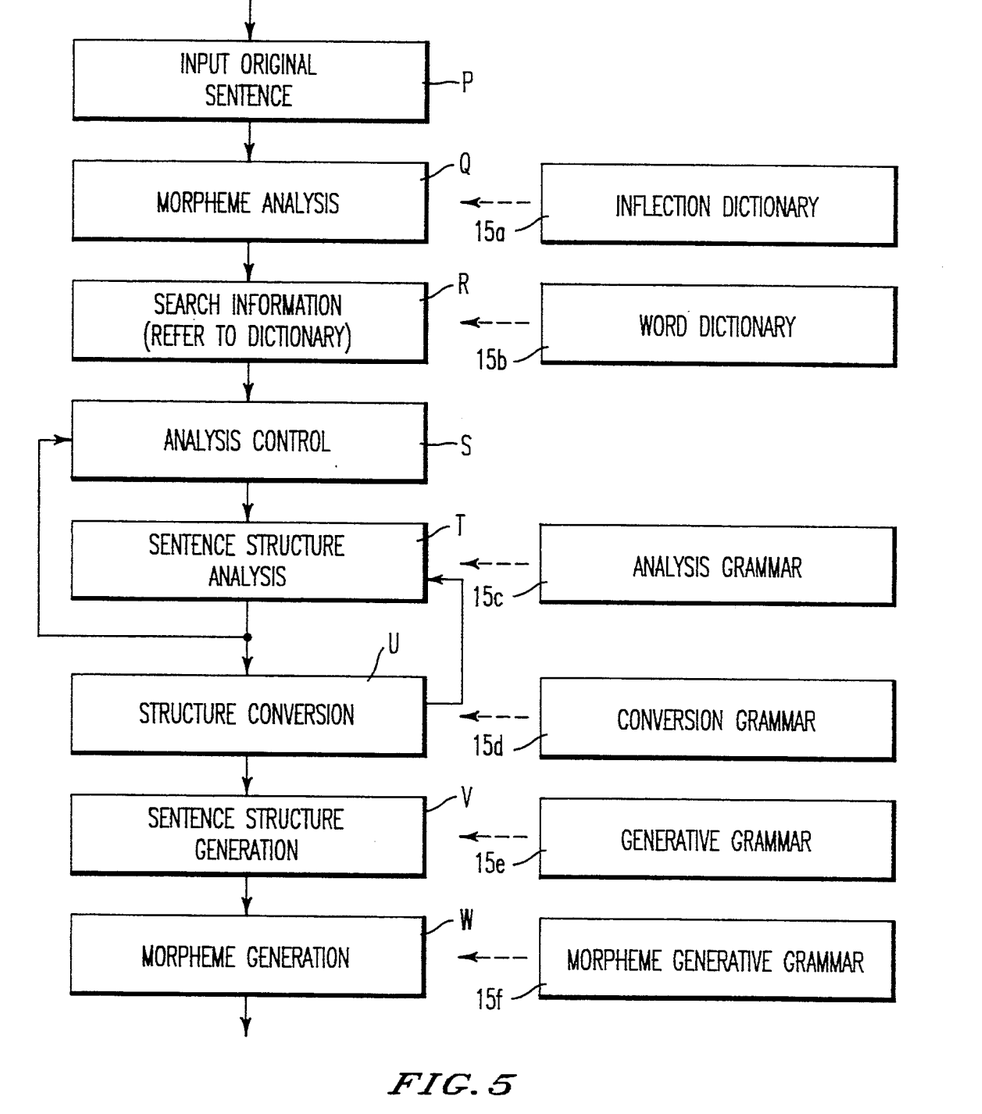

The translation processing (step G) for the original sentence is executed, e.g., as follows. FIG. 5 shows a processing sequence of the translation processing (step G shown in FIG. 4). The translation section 14 first receives an original sentence to be translated (step P), and analyzes the input original sentence in units of morphemes (step Q). Morpheme analysis processing includes processing for converting an original word, which is for example, conjugated or inflected, into its original form (fundamental form), using the inflection dictionary 15a which is stored in the dictionary section 15. For the morpheme analyzed original words, their part of speech information and translated word information and other properties are derived with reference to the word dictionary 15b (step R). This processing is performed by accessing the word dictionary 15b using the original word as a keyword.

Sentence structure analysis of the original sentence is performed (step T) under the predetermined analysis control according to the analysis grammar 15c (step S). sentence structure analysis is repetitively performed until it is successful. With this sentence structure analysis, the arrangement of parts of speech of the original words constituting the original sentence, their modification relationship, tense, and the like are obtained.

Thereafter, the analyzed sentence structure is converted to the sentence structure of the translated sentence using the conversion grammar 15d (step U). In other words, the sentence structure of an English sentence (original sentence) is converted to a Japanese sentence (translated sentence) using the conversion grammar 15d. If sentence structure conversion is unsuccessful, it is determined that sentence structure analysis of the original sentence was erroneously performed and it is performed again.

Translation candidacies obtained for the respective words of the original sentence based on the sentence structure of the translated sentence are sorted in word order according to the linguistical format of the translated sentence, to obtain a translation sentence candidacy corresponding to the original sentence (step V). This sentence structure generation processing is executed in accordance with the generative grammar 15e. The translated word candidacies constituting the translated sentence candidacy are conjugated and inflected in accordance with the result of the sentence structure generation and the morpheme generative grammar 15f, thus producing the translated sentence (step W).

The translated sentence corresponding to its original sentence which is obtained through the translation processing is stored into the translated storage section 16b.

Basically, the translation/edit processing for the translated sentence is realized by executing processing corresponding to the edit key group 23 with respect to a word (original word, original phrase, translated word, or translated phrase) indicated by the cursor on the screen of the display section 18. More specifically, this processing is performed as follows:

(1) Upon operation of an insert key, a character is inserted before a cursor position.

(2) Upon operation of a delete key, a character string within a range indicated by the cursor is deleted.

(3) Upon operation of a move key, a character string within a range indicated by the cursor is moved.

(4) Upon operation of a cancel key, respective edit functions specified by the corresponding keys are made invalid.

(5) Upon operation of a modification key, other modification candidacies of a word indicated by the cursor are displayed.

When the function key 24 is operated, the following functions can be used in the translation/edit processing for the translated sentence.

(1) Upon operation of a translated word display key, a translated word for a word in an original sentence indicated by the cursor is displayed.

(2) Upon operation of a dictionary display key, the content of the dictionary section 15 is displayed using a word in an original sentence indicated by the cursor as a keyword.

(3) Upon operation of a dictionary registration key, a character string indicated by the cursor is registered in the dictionary section 15 as a new word or phrase.

(4) Upon operation of a dictionary clear key, the registered new words or phrases are cleared.

Note that indication of a character string (word) by means of the cursor is performed while moving the cursor on the display screen using the cursor control key group 25 and enlarging or reducing a cursor size by a cursor control key.

The basic translation/edit processing in this system has been described. In addition to this, the system of this embodiment has the display control function, and the details of the display control section 17 will be explained using FIG. 6.

Figure 6:
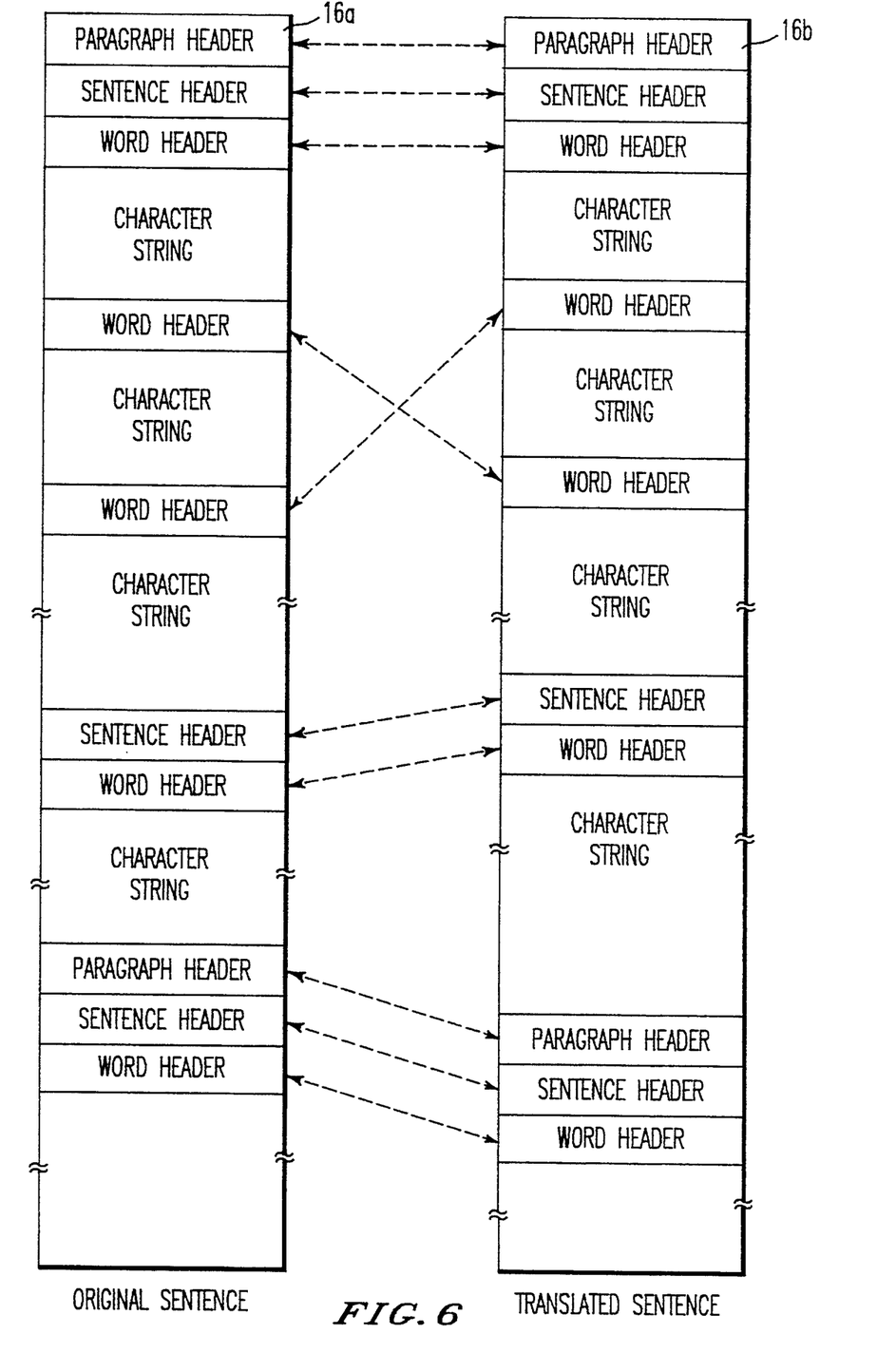

The original sentence input from the input section 11 is not separated into translating units. Therefore, the input control section 12 divides the character strings sequentially under a constant condition. Namely, the input sentence is classified as, e.g., a general sentence, an itemized sentence, a title, etc. The judgement of condition and the recognition of the sentences are executed to said classified sentences. For example, by the condition of the general sentence, the end of sentence is recognized as being blank or new paragraph after the punctuation symbols (. ? ! ; : etc.). However, the following cases are not classified as the end of sentence, (1) when there are punctuation symbols between the double quote ("), (2) when the word is stored in the dictionary with a punctuation symbol, e.g., Mr. etc. (3) when a capital letter followed by a period (.) is repeated more than two times. In these cases, the text sentence is not recognized as the end of a sentence from the period of halfway position.

"I like fish." said he.

Mr. Smith is doctor.

A caption is recognized as a title, header, subheader, etc., by the sentence structure of "header number+-body". Numerals, numerals+period, special characters or numerical patterns surrounded by parenthesis are recognized as a header number.

If a first character of the word is a capital letter or a numeral, it is recognized as the body of a title. For example, following words are recognized as a title;

Introduction

INTRODUCTION

1. Introduction (1) INTRODUCTION

In this case, if first characters of these words are not capital letters, an article, a preposition and a conjunction. etc., are recognized as a part of the title. The sentence and the title recognized at the input control section 12 are stored in the original storage section 16a in the form shown in FIG. 6. A paragraph header is established at the paragraph being recognized. A sentence header is established as an unit of sentence recognition, and a type of sentence, a new paragraph, a number of blank and a sentence number, etc., are stored. A word header is established as an unit punctuated by a space between words before the translation completion when the original is English, and idioms, etc., are added prior to translation completion. The translated sentence having the original sentence's information is stored in the translation storage section 16b corresponding to the original storage section 16a.

The edit control section 13 sequentially receives the translated sentence from the translation storage section 16b, and displays the translated sentence on the display section 18 using the paragraph and sentence header informations. At this time, a correspondence table in which stored sentences and word addresses corresponding to the display positions on the display screen may be generated.

If the original language sentence is the input from the keyboard of the input section 11, the display control section 17 finds the position of the corresponding original sentence stored in the original storage section 16a based on the paragraph and sentence information stored in the translation storage section 16b, and sets up the original sentence display region 18b in the upper portion of the display screen. The original sentence and the succeeding and preceding parts or sentences are displayed as far as possible (shown in FIG. 7).

Figure 7:
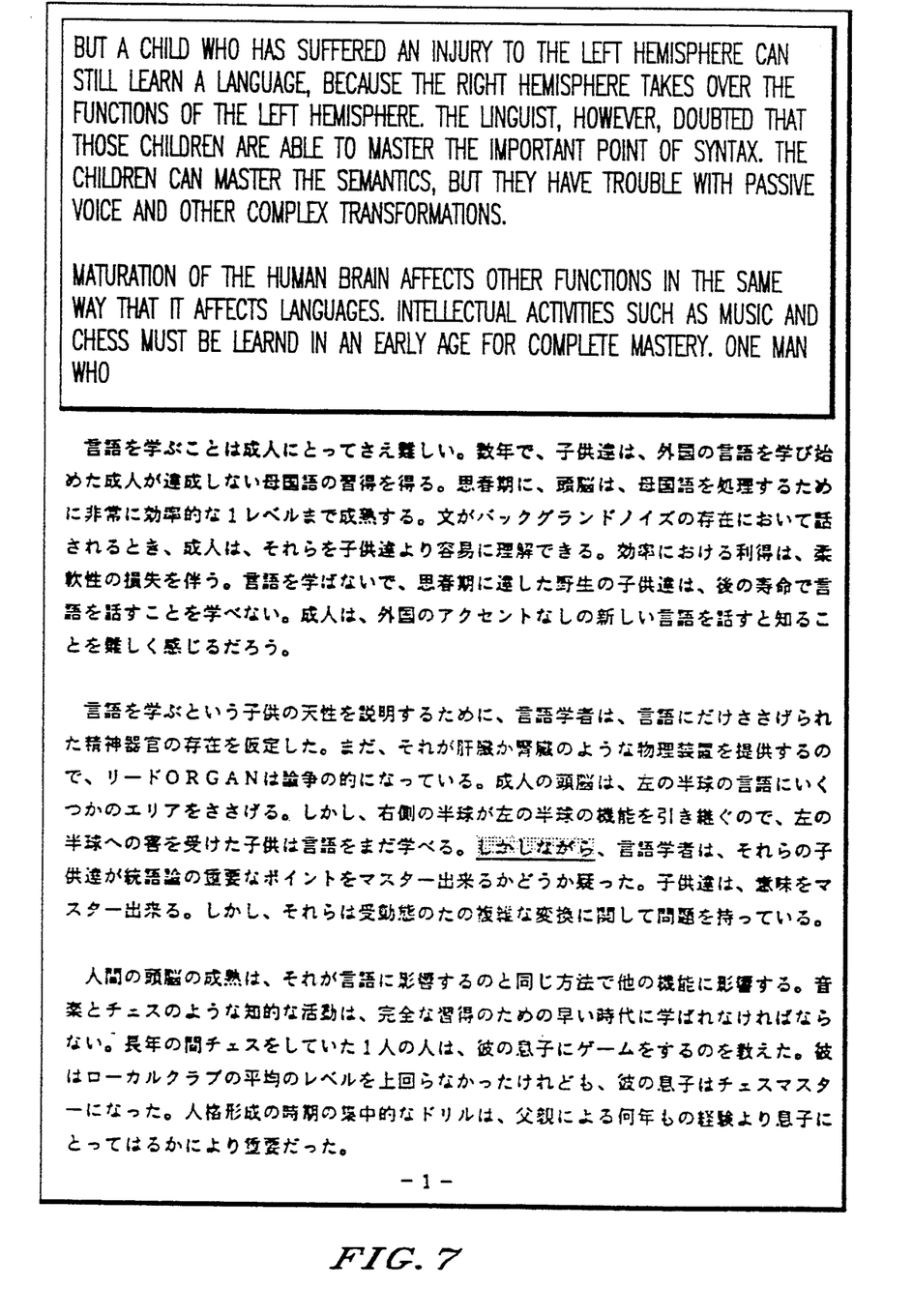
FIG. 7 shows a sample displayed screen of the present invention.

FIG. 7 shows a screen on which is displayed translated Japanese sentences and the in corresponding original English sentences. The English original sentences displayed on the upper side of screen correspond to the identified original sentences.

In particularly, the part of the original English sentence masked by the dotted mesh corresponds to the translated Japanese sentence, including the underlined part to which reference was made. The succeeding and preceding sentences of the dotted mesh area are correspond to the succeeding and preceding sentences of the underlined sentence of the translated sentences, and are displayed within the limits of the predetermined area established on the upper portion of the display screen.

Thus, if the original sentence referring request is executed, the display control section 17 searches the corresponding original sentence in accordance with a control sequence (shown in FIG. 8), and establishes the original sentence display region 18b at the upper part of the translated sentence display region 18a.

Figure 8:
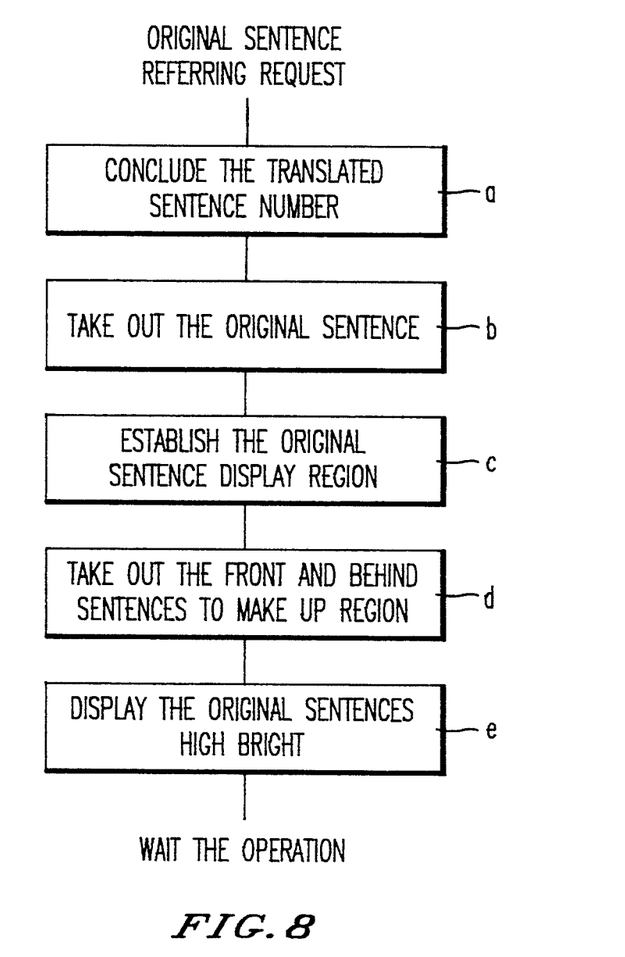

Concrete operation is explained using FIG. 8. The original sentence referring request is executed to move the cursor on the desired position using the cursor control key group 25.

Thereafter, the original sentence referring request is instructed by the function key group 24. The display control section 17 concludes the number of the translated sentence corresponding to the requested original sentence (step a), and takes out the original sentence having the concluded sentence number from the original storage section 16a (step b). The original sentence display region 18a is established at a part of the translated sentence display region 18b (step c). Thereafter, line numbers of the original sentences and the predetermined line number of the original sentence display region 18b are compared. If the lines of the original sentence taken out is deficient, the sentences succeeding and preceding the requested original sentence are taken out to make up the remaining region of the predetermined original sentence display region 18b (step d). The succeeding and preceding sentences are displayed with the referred original sentence (step e).

The dotted mesh part (corresponding to the underlined part of the translated sentence) in the original sentence display region 18b shown in FIG. 7 is the referred sentence, and this part is highlighted, for example, with higher brightness than the succeeding and preceding sentences.

Figure 9:
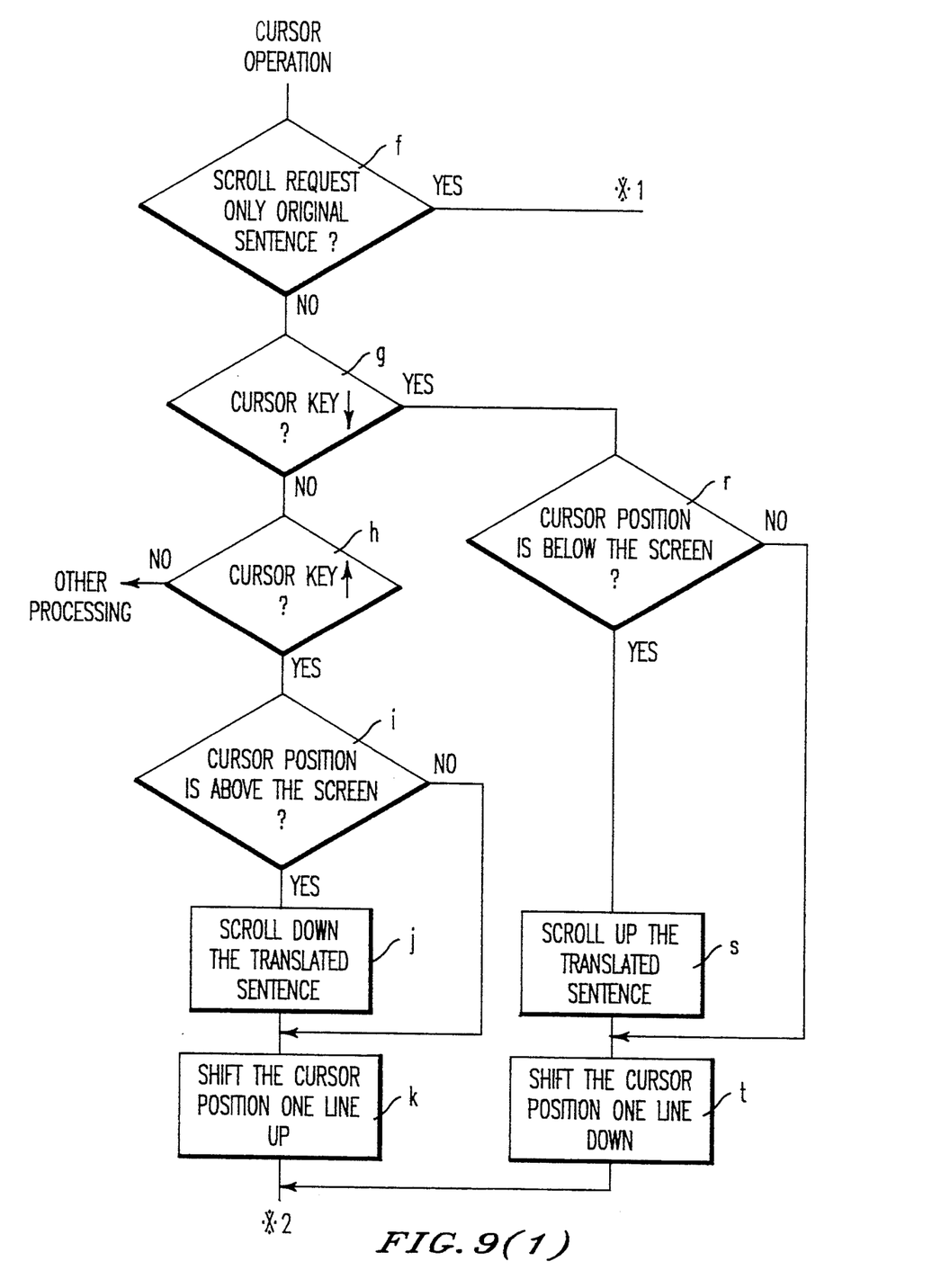

FIGS. 9(I)–9(III) describes the flow chart of the scrolling function in the state of displaying both sentences, i.e., translated sentences and referred original sentences.

An operator requests the scrolling to handle the cursor, and selects synchronized scrolling of the translated and original sentence if desired (step f). If synchronized scrolling is requested, the cursor movement direction is selected (steps g, h), and the cursor position is checked to determine whether it is an upper limit or not (step i).

The translated sentence is scrolled down when the cursor reaches the upper limit (step j).

Scrolling down is executed, e.g., to shift the data on the translation storage section 16b, and to redisplay each line. If the display apparatus has a scrolling function, the scrolling down is executed to redisplay only the new lines.

If the cursor position does not reach the upper limit, scrolling down is not executed (step j), and the cursor position is shifted up one line (step k).

If the cursor position does not reach the downward limit, scrolling-up is not executed, and cursor position is shifted down one line (step t). The cursor position is shifted to the requested position by a series of operation. At this time, if the scrolling request is for the translated sentence only, the scrolling process is terminated (step 1).

Next, operation of the synchronized scrolling will be explained. The sentence number and the word number of the requested translated sentence are identified based on the referring requested cursor position in the translated sentence (step m).

Figure 10:
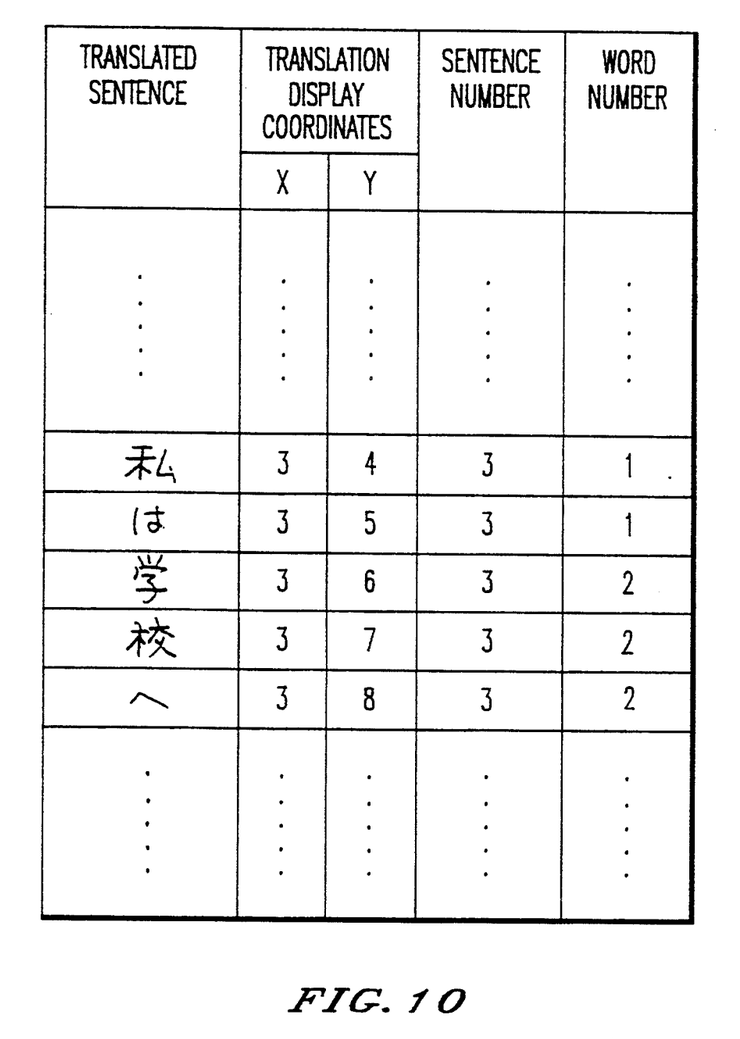
FIG. 10 shows a corresponding table for use in the present invention.

The sentence number and the word number are provided using a corresponding table in which the sentence and word numbers are stored. FIG. 10 describes a format for such a corresponding table. The position of the translated sentence is provided in terms of coordinates, on the X and Y axes of the display screen. The X and Y axes correspond to each character of the translated sentence. The sentence number and the word number of the original sentence correspond to the characters of the translated sentence.

The scrolling operation will be explained again, using FIG. 9(I)–9(III). If the sentence and word numbers corresponding to the cursor are used, it is determined whether the original sentence corresponding to the original sentence display region is displayed (step n). If the corresponding original sentence is already displayed, it is determined whether the words corresponding to the cursor position are displayed in the original sentence (step o).

If original sentences or words corresponding to the translated sentences are not displayed, scrolling is executed to display the corresponding sentences (step p). The method of this scrolling is substantially the same as in the above mentioned case. The cursor on the original sentence has high brightness when the corresponding original sentence is already displayed or is moved by scrolling (step q) into the display. The above mentioned operations (steps p and q) are executed in synchronism to display the translated sentence.

If only scrolling of the original sentence requested, the scroll operation (steps g and h) is not executed, and the scroll operation for the original display region is executed using the same process (step u). First, the direction of the cursor shift key is checked (steps u and V). It is determined whether the cursor position is at the upper limit of the original display region 18b (step w). If the cursor position is at the upper limit, the original sentence is scrolled down line by line (step x). If the cursor position is not at the upper limit, the higher brightness area is shifted up one line (step Y).

If the cursor shift key is in the downward direction. it is determined whether the cursor position is at the downward limit of the original sentence display region 18b (step z). If the cursor position is at the lower limit, the original sentence is scrolled up one line (step α).

If the cursor position is not at the lower limit of the original sentence display region, the high brightness area is shifted down one line (step β).

FIGS. 11 and 12(a)–12(c) describe the expansion operation of above mentioned original sentence referring request function. The functional expansions are used to refer to the translating dictionary corresponding to the original sentence, and to convert from a referred translating word to the translated sentence. The cursor control is switched to the original sentence display region 18b, shown in FIG. 12(a), and the cursor is shifted to desired original word. The function control key Group 24 controls the dictionary referring request. By this operation, the original word identified by the cursor is separated from the original storage section 16a, and morpheme analysis is executed on this original word. As a result, the original format of the dictionary is obtained (step 101 shown in FIG. 11).

Figure 11:
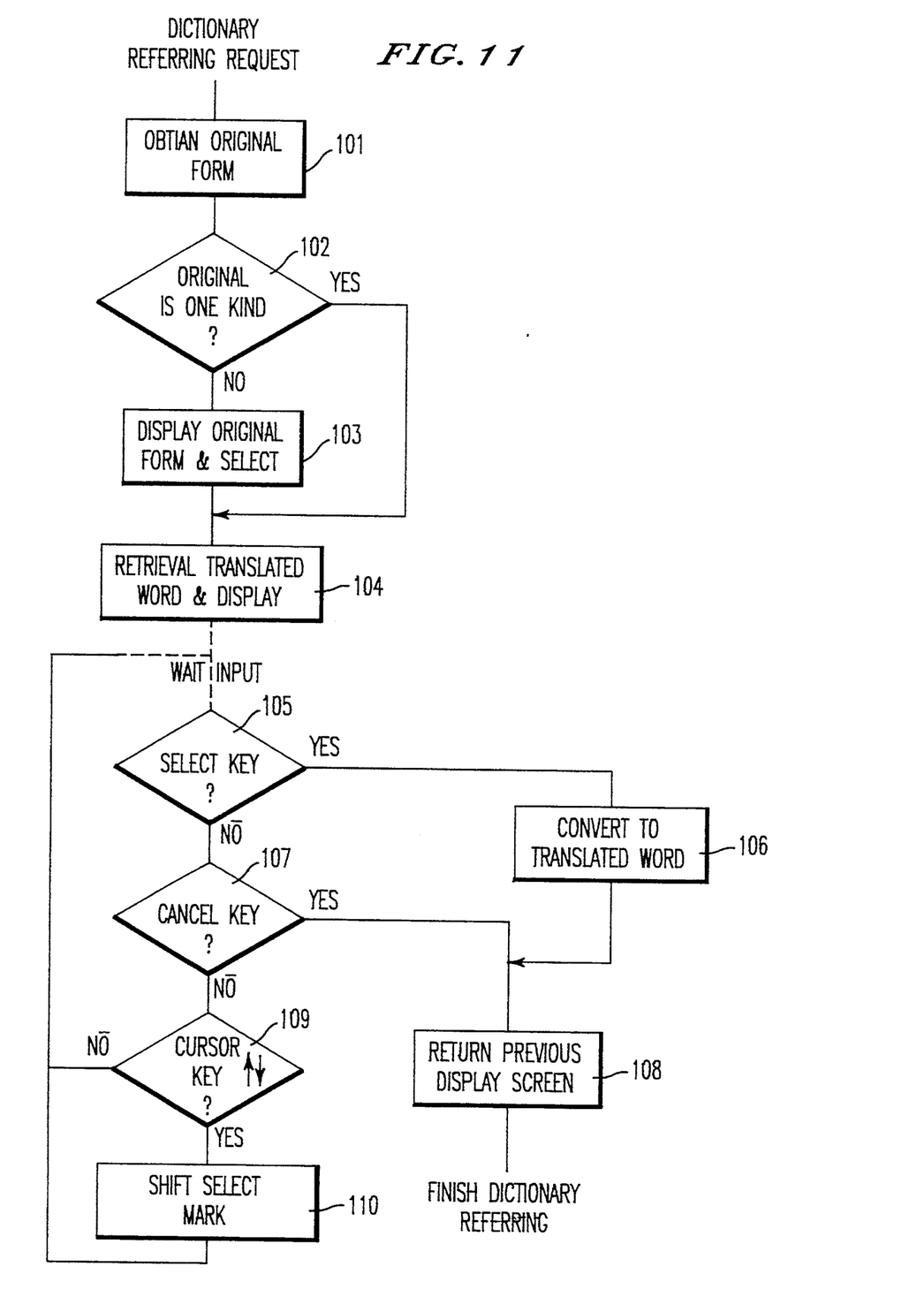
Figure 12A:
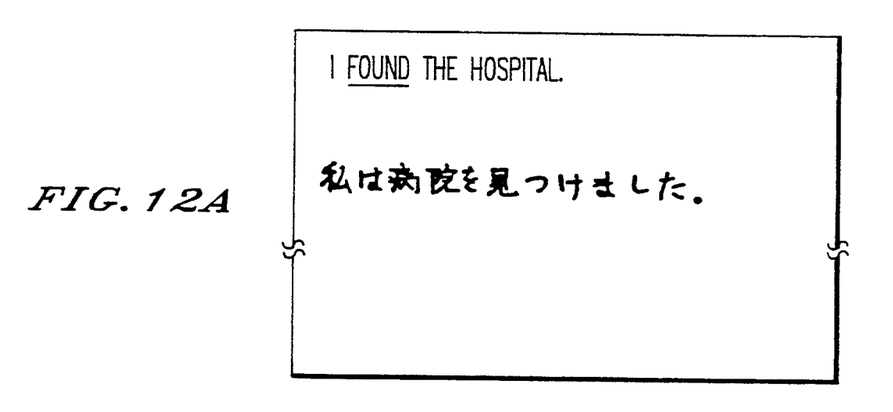
FIG. 12(a)–(c) shows a sample displayed screen of the another embodiment of the present invention.
Figure 12B:
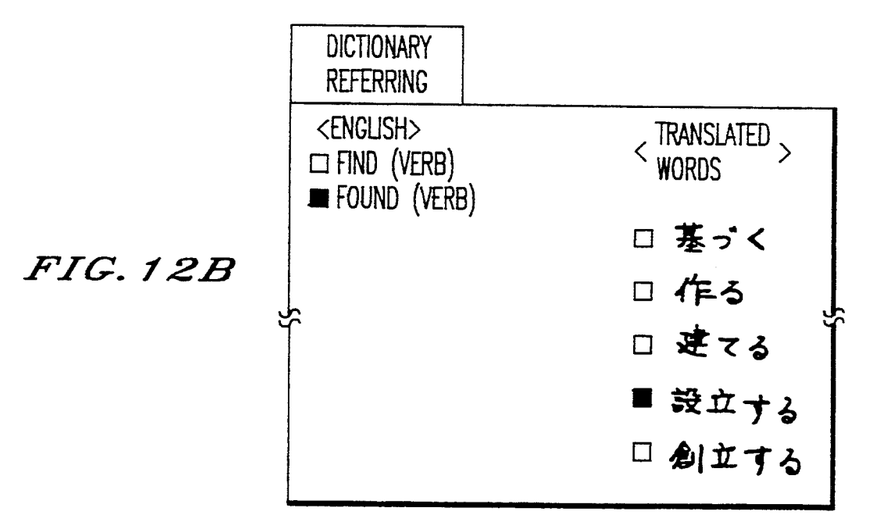
Figure 12C:
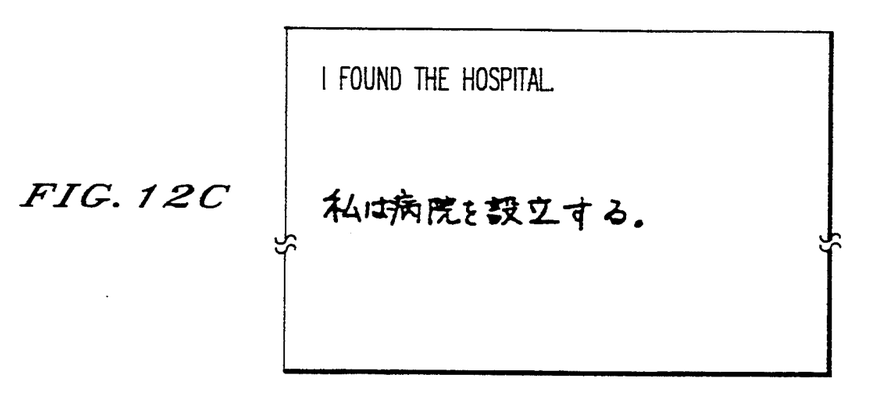

If the original word format is one of a plurality of distinct types, all of the obtained original word formats are displayed on the screen, and an operator can select the desired word (steps 102 and 103). The word dictionary 15b is retrieved using the original word format, and the corresponding translated word is displayed on the display section 18 (step 104).

Next, the operator selects the desired translated words by use of the cursor shifting key (steps 109 and 110). The word header of the translated sentence corresponding to the word number of the original sentence in which that word header is stored is replaced with the translated word (steps 105 and 106).

Thereafter the display screen is returned to the previous display screen, and the desired translated sentence is obtained. The display screen is simultaneously returned if a cancel key is operated (steps 107 and 108).

In this invention, the corresponding original sentence is displayed on a part of the display screen during editing of the translated sentence so that an operator can to refer to it. An operator also is able to scroll the referred original sentence in synchronism with the translated sentence. Therefore editing of the translated sentence may be precisely executed while referring to the format of the original sentence.

Further, an operator can effectively confirm the translation result while observing the content of the original format, and can effectively edit the translated sentence. Thus, the invention simplifies translation editing work and results in a more appropriate and accurate document.

What is claimed is:

1. A method for displaying in a related manner translated texts and their corresponding original texts being referred to on a display section of a machine translation apparatus, comprising the steps of:

dividing input original texts into units under a given condition on the basis of their descriptions and writing into a first memory the divided original texts with an identification number assigned for each of the divided texts;

writing into a second memory corresponding translated texts in units translated from the original texts written in the first memory, the translated texts being assigned with identification numbers each corresponding to each of the identification numbers assigned for each of the divided original texts;

displaying the translated texts written in the second memory on an entire area of a translated text display region in the display section;

registering in a table a relationship between a display position of each unit of the translated texts displayed on the translated text display region and respective identification numbers of each unit of the original texts corresponding to the translated texts;

specifying a part of the translated texts being displayed, in response to issuance of a demand for referring to a corresponding part of the original texts, for recognizing the display position on the translated text display region of the specified part of the translated texts from the table and securing an original text display region for displaying the corresponding original texts; and determining an identification number of a part of the original texts corresponding to the specified part of the translated texts from the table, and retrieving from the first memory the part of the original texts corresponding to the specified part of the translated text on the basis of the determined identification number of the part of the original texts, and displaying the retrieved part of the original texts on the original text display region.

2. The method of claim 1, wherein proceeding and succeeding parts of the original texts being referred to are also displayed so that an entire area of the original text display region is filled out.

3. The method of claim 2, further comprising the step of selectively executing, in response to issuance of a scroll instruction and an operator's instruction issued in advance, any one of the following scroll operations:

(a) a non-synchronous scroll operation for sequentially shifting and displaying proceeding or succeeding parts of the translated texts displayed on the translated text display region;

(b) a synchronous scroll operation for sequentially shifting and displaying the proceeding or succeeding parts of the translated texts displayed on the translated text display region and also for sequentially shifting and displaying within the original text display region the proceeding or succeeding parts of the corresponding original texts displayed in synchronism with the shifting and displaying of the translated texts; and (c) a non-synchronous scroll operation for sequentially shifting and displaying within the secured region the proceeding or succeeding parts of the original texts displayed on the original text display region.

4. The method of claim 2, further comprising the step of highlighting, among the original texts displayed on the original text display region, the part of the original texts whose identification number corresponds with the specified part of the translated texts so as to distinguish over the proceeding and succeeding parts thereof.

5. The method of claim 4, wherein the step of highlighting includes the step of brightening the part of the original texts corresponding to the specified part of the translated texts.

6. The method of claim 4, wherein the step of highlighting includes the step of underlining the part of the original texts corresponding to the specified part of the translated texts.

7. The method of claim 2, further comprising the step of further displaying, in a further region on the display section, all retrieval translated words corresponding to a specified word or a specified idiom in the displayed original texts on the original text display region in response to a dictionary referring request for the specified word or idiom.

8. The method of claim 7, further comprising the step of replacing, in response to an operator's selection of one of the displayed retrieval translated words, a translated word in the translated texts corresponding to the specified word or idiom in the original texts with the selected one of the translated words.

9. A machine translation apparatus having a first memory for storing original texts as units, a translation dictionary for obtaining translated sentences of the original texts, a second memory for storing translated texts as units, a display section for displaying the texts stored in the first and second memories and an input section for inputting various editing commands or various character information with respect to the texts to be displayed, comprising:

input control means for dividing original texts input through the input section or input as a file under a given condition on the basis of their descriptions and writing into the first memory the original texts with identification numbers assigned for each of the divided texts;

translation means for reading the original texts written in the first memory and translating, by referring to the translation dictionary, the original texts divided into the units in accordance with the identification numbers to obtain translated texts;

first editing control means for writing into the second memory the obtained translated texts with identification numbers assigned in correspondence with each of the divided units of the original texts;

first display control means for displaying the translated texts written in the second memory on an entire area of a translated text display region in the display section;

table means for registering a relationship between a display position of each unit of the translated texts displayed on the translated text display region and respective identification numbers of each unit of the original texts corresponding to the translated texts;

second editing control means for specifying a part of the translated texts being displayed and acquiring, in response to issuance of a demand for referring to a corresponding part of the original texts, information on the display position in the translated text display region of the specified part of the translated texts from the table means; and second display control means for securing an original text display region for displaying a part of the original texts corresponding to the specified part of the translated texts, for determining an identification number of the part of the original texts corresponding to the specified part of the translated texts from the table, retrieving from the first memory the part of the original texts corresponding to the specified part of the translated texts on the basis of the determined identification number of the part of the original texts, and displaying the retrieved part of the original texts on the original text display region.

10. The apparatus of claim 9, wherein the second display control means displays, when the original text display region is not filled out by the found part of the original texts, proceeding and succeeding texts of the found part of the original texts until the original text display region is filled out.

11. The apparatus of claim 10, wherein the second display control means further comprises highlight display means for highlighting the part of the original texts found by retrieval of the original texts displayed on the original text display region to distinguish over the proceeding and succeeding texts thereof.

12. The apparatus of claim 11, wherein the highlight display means brightens the found part of the original texts.

13. The apparatus of claim 11, wherein the highlight display means underlines the found part of the original texts.

14. The apparatus of claim 10, further comprising third display control means for sequentially shifting and displaying proceeding or succeeding parts of the translated texts displayed on the translated text display region by the second display control means in response to a scroll instruction issued through the input section.

15. The apparatus of claim 10, further comprising third display control means for sequentially shifting and displaying proceeding or succeeding parts of the translated texts displayed on the translated text display region in response to a scroll instruction issued through the input section and also for sequentially shifting and displaying proceeding or succeeding parts of the original texts displayed on the original text display region in synchronism with the shifting display of the translated texts.

16. The apparatus of claim 10, further comprising third display control means for sequentially shifting and displaying, within the original text display region, proceeding or succeeding parts of the original texts in response to a scroll instruction issued through the input section.

17. The apparatus of claim 10, further comprising third editing control means for retrieving all translated words registered in the translation dictionary for a specified word or a specified idiom in the original texts displayed on the original text display region in response to issuance of a dictionary referring demand with respect to the specified word or idiom, and third display control means for displaying the retrieved translated words on the translated text display region.

18. The apparatus of claim 17, further comprising fourth editing control means for replacing, in response to an operator's selection of one of the displayed translated words, a translated word in the translated texts corresponding to the specified word or idiom in the original texts with the selected one of the translated words.

19. The apparatus of claim 9, wherein the first memory stores the original texts in units of character strings divided by the identification numbers and the second memory stores the translated texts in units of character strings divided by the identification numbers.

* * * * *